(12) United States Patent
Baksh et al.

(10) Patent No.: US 7,396,387 B2
(45) Date of Patent: Jul. 8, 2008

(54) PRESSURE SWING ADSORPTION PROCESS FOR LARGE CAPACITY OXYGEN PRODUCTION

(75) Inventors: Mohamed Safdar Allie Baksh, Wheatfield, NY (US); Andrew Rosinski, Orchard Park, NY (US)

(73) Assignee: Praxair Technology, Inc., Danbury, CT (US)

( * ) Notice: Subject to any disclaimer, the term of this patent is extended or adjusted under 35 U.S.C. 154(b) by 427 days.

(21) Appl. No.: 11/264,278

(22) Filed: Nov. 1, 2005

(65) Prior Publication Data
US 2007/0095208 A1 May 3, 2007

(51) Int. Cl.
*B01D 53/047* (2006.01)
(52) U.S. Cl. .................. 95/96; 95/98; 95/101; 95/102; 95/130
(58) Field of Classification Search ............. 95/95–106, 95/130
See application file for complete search history.

(56) References Cited

U.S. PATENT DOCUMENTS

| 4,859,217 | A |   | 8/1989  | Chao |
| 4,869,894 | A | * | 9/1989  | Wang et al. ............... 423/650 |
| 4,892,565 | A | * | 1/1990  | Schmidt et al. ............. 95/101 |
| 4,915,711 | A |   | 4/1990  | Kumar |
| 5,330,561 | A | * | 7/1994  | Kumar et al. ............... 95/101 |
| 5,413,625 | A |   | 5/1995  | Chao et al. |
| 5,518,526 | A |   | 5/1996  | Baksh et al. |
| 5,656,068 | A |   | 8/1997  | Smolarek et al. |
| 5,997,612 | A |   | 12/1999 | Doong |
| 6,007,606 | A |   | 12/1999 | Baksh et al. |
| 6,010,555 | A |   | 1/2000  | Smolarek et al. |
| 6,017,382 | A | * | 1/2000  | Ji et al. .................... 95/103 |
| 6,027,548 | A |   | 2/2000  | Ackley et al. |
| 6,210,466 | B1 | * | 4/2001 | Whysall et al. ............. 95/100 |
| 6,340,382 | B1 | * | 1/2002 | Baksh et al. ............... 95/96 |
| 6,428,607 | B1 | * | 8/2002 | Xu et al. .................. 95/101 |
| 6,471,748 | B1 |   | 10/2002 | Ackley |
| 6,500,234 | B1 |   | 12/2002 | Ackley et al. |
| 6,506,234 | B1 |   | 1/2003 | Ackley et al. |
| 6,527,830 | B1 | * | 3/2003 | Neu et al. ................. 95/98 |
| 6,743,745 | B2 |   | 6/2004 | Jaussaud et al. |
| 6,780,806 | B1 |   | 8/2004 | Yang et al. |
| 6,790,260 | B2 |   | 9/2004 | Ackley et al. |
| 7,179,324 | B2 | * | 2/2007 | Baksh et al. .............. 95/100 |
| 2002/0121193 | A1 | * | 9/2002 | Baksh et al. ............... 95/96 |
| 2003/0097930 | A1 | * | 5/2003 | Kleinberg et al. .......... 95/96 |

FOREIGN PATENT DOCUMENTS

| EP | 0 598 319 A | 5/1994 |
| EP | 1 219 339 A2 | 7/2002 |

* cited by examiner

*Primary Examiner*—Frank M Lawrence
(74) *Attorney, Agent, or Firm*—Flora W. Feng, Esq.

(57) ABSTRACT

The present invention generally relates to large capacity (e.g., greater than 350 tons/day $O_2$) vacuum pressure adsorption (VPSA) systems and processes that employ a single train including four beds, at least one feed compressor feeding two beds simultaneously at any given instant in time, and a single vacuum pump. The compressor(s) and the vacuum pump can be utilized 100% of the time. Use of product quality gas for purging is avoided, with about 10-20% improvement in $O_2$ productivity and 5-10% reduction in capital cost expected.

40 Claims, 9 Drawing Sheets

Novel Four Bed VPSA Process Using Highly Exchanged LiX Adsorbent.

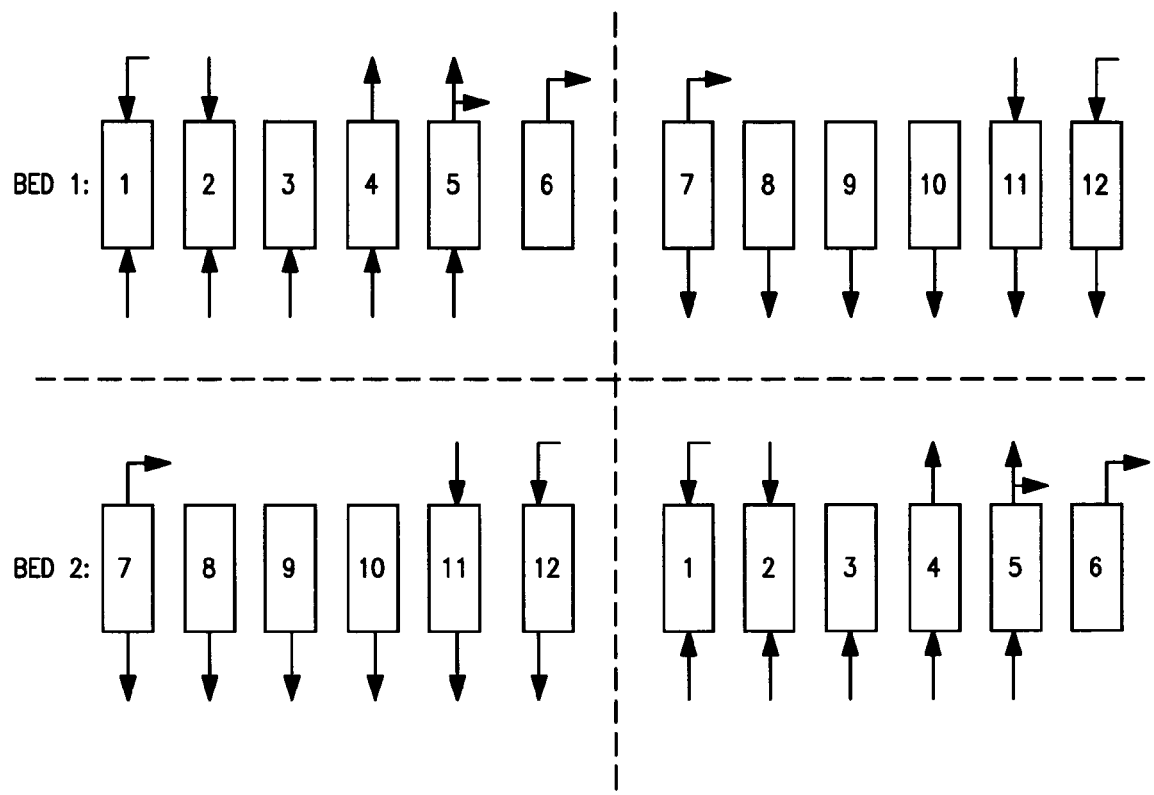

1 = Rising Pressure Feed with Overlap Equalization
2 = Rising Pressure Feed with Overlap Product Pressurization
3 = Rising Pressure Feed
4 = Constant Pressure Feed with Product Make
5 = Constant Pressure Feed with Product Make and Purge
6 = Falling Pressure Equalization
7 = Falling Pressure Evacuation with Overlap Equalization
8,9,& 10 = Falling Pressure Evacuation
11 = Constant Pressure Evacuation with Oxygen Purge
12 = Rising Pressure Evacuation with Overlap Equalization

FIG. 1

Alternative schematic of the four bed process using two compressors to deliver the total feed to the dual inlet feed VPSA process.

PRESSURE SWING ADSORPTION PROCESS FOR LARGE CAPACITY OXYGEN PRODUCTION

TECHNICAL FIELD

The present invention generally relates to large capacity (e.g., greater than 350 tons/day $O_2$) vacuum pressure adsorption (VPSA) systems and processes that employ a single train including four beds, at least one feed compressor feeding two beds simultaneously at any given instant in time, and a single vacuum pump. The compressor(s) and the vacuum pump can be utilized 100% of the time. Use of product quality gas for purging is avoided, with about 10-20% improvement in $O_2$ productivity and 5-10% reduction in capital cost expected.

BACKGROUND OF THE INVENTION

The production of oxygen from air currently uses vacuum pressure swing adsorption (VPSA) or pressure swing adsorption (PSA) systems technology. These systems often have a capacity of <200 tons per day $O_2$. Presently, there is renewed interest in extending the capacity of VPSA or PSA systems from such small scale (<200 tons per day $O_2$) to large scale (about 350 tons per day $O_2$ or higher) oxygen production from air.

In the application of VPSA or PSA processes, the energy input required to achieve the separation of $O_2$ from the feed mixture (e.g., air) is provided as mechanical work through feed compressor(s) and vacuum pump(s). The cost of this work is a significant component of the total operating cost of the VPSA or PSA process. In addition, VPSA or PSA technology is currently economically competitive with cryogenic distillation only for small scale applications. In order for PSA or VPSA processes to become cost competitive with cryogenic distillation for large scale applications, improved cycles are required to operate the PSA or VPSA processes.

Two bed vacuum pressure swing adsorption (VPSA) processes for the production of oxygen from air are disclosed U.S. Pat. No. 5,518,526 to Baksh et al. and U.S. Pat. No. 6,010,555 to Smolarek et al. U.S. Pat. Nos. 5,518,526 and 6,010,555 employ VPSA processes with simultaneous equalization and evacuation steps followed by simultaneous feed and product pressurization steps. FIG. 1 shows the VPSA cycle for the production of oxygen from air disclosed in Smolarek et al., U.S. Pat. No. 6,010,555. U.S. Pat. Nos. 5,518, 526 and 6,010,555 are both for small scale (<200 tons per day, (TPD)) oxygen production. Adsorption and desorption pressures in U.S. Pat. Nos. 5,518,526 and 6,010,555 are characterized by a low pressure ratio and relatively high desorption pressure values. Significant reduction in equipment and operating costs can be realized using the small scale (<200 TPD $O_2$) VPSA processes of U.S. Pat. Nos. 5,518,526 and 6,010, 555.

In applications where large scale oxygen production (e.g., 350 tons per day $O_2$) is desirable, four bed VPSA processes are used. One such VPSA process is disclosed by Smolarek et al., U.S. Pat. No. 5,656,068. The four bed VPSA process disclosed in U.S. Pat. No. 5,656,068 is operated as two pairs of 2-bed systems, referred to as a 2×2 cycle/system. Each pair of beds is operated 180° out of phase and the two pairs of beds are operated out of phase by one-half of a half-cycle. Two compressors (one Roots or positive displacement and one Centrifugal) and two vacuum pumps (one Roots or positive displacement and one Centrifugal) are disclosed in the VPSA process of U.S. Pat. No. 5,656,068. One of the two compressors is periodically in the idle or vent mode. A four bed VPSA system operating as two pairs of adsorption beds to produce about 100 tons per day (TPD) oxygen is disclosed in Doong, U.S. Pat. No. 5,997,612 to Doong. The VPSA process includes two pairs of beds, an intermediate storage tank (to collect co-current depressurization gas), one gas blower and a pair of vacuum pumps. The system disclosed in Doong (U.S. Pat. No. 5,997,612) includes three pumps as compared to the four pumps disclosed in U.S. Pat. No. 5,656,068. In addition, the system shown in Doong (U.S. Pat. No. 5,997,612) is for small scale oxygen production (<200 tons per day) rather than large scale $O_2$ production using the dual feed VPSA process of Smolarek et al. (U.S. Pat. No. 5,656,068).

It would thus be desirable to provide cost efficient, highly productive four bed VPSA processes and systems with the capacity for large scale oxygen production (e.g., >350 tons/day $O_2$).

BRIEF SUMMARY OF THE INVENTION

The present invention generally relates to four bed VPSA systems and processes with dual feed inlet for large scale oxygen production (e.g., >350 tons/day $O_2$). The systems of the present invention include the implementation of three pumps (e.g., two compressors and one vacuum pump) rather than four pumps (e.g., two compressors and two vacuum pumps) as disclosed in U.S. Pat. No. 5,656,068. The present invention additionally contemplates the use of unique four-bed VPSA cycles that include 100% utilization of the compressors and vacuum pump while at the same time allows two beds to simultaneously receive feed gas. Moreover, at any instant in time during the four bed VPSA cycle, two beds are receiving feed simultaneously while the other two beds are in the regeneration/refluxing mode.

The processes and systems provided in accordance with the present invention include multiple advantages. For example and while not to be construed as limiting, systems and processes of the present invention can include: (1) continuous feed and product make steps; (2) a minimum of one compressor and one vacuum pump; (3) 100% utilization of the compressors and vacuum pump; (4) smaller product storage/buffer tanks relative to prior art processes due to continuous feed and product make steps; (5) the option of using the same or different compressors (e.g., centrifugal and Roots) for compressing the inlet feed to the VPSA process; (6) the purging gas coming from another bed that is undergoing co-current depressurization step, and this purging gas goes directly to another bed undergoing the purging step without the use of any additional storage tank; (7) the purging step sandwiched between the evacuation steps in the VPSA cycle (i.e., the VPSA cycle has an evacuation step before and after the purging step to allow the use of void space gas for purging of another bed directly (without the need of an additional storage tank) or to avoid using product quality gas for purging); (8) use of sorbents with high intrinsic adsorption rates and optimum particle size to increase mass transfer rate, high $O_2$ product recovery, and low bed size factor (BSF) in fast-cycle shallow adsorbers in the VPSA process, and/or (9) all the steps of the four bed VPSA process fully integrated so that none of the beds has any idle step(s).

Consequently, systems of the present invention are thus expected to provide about 10-20% improvement in $O_2$ productivity/recovery and 5-10% reduction in capital cost as oxygen is produced on a large scale (>350 Tons/day) basis using a single train, one less pump, lower bed size factor, and avoids the use of product quality gas for purging.

BRIEF DESCRIPTION OF THE DRAWINGS

For a more complete understanding of the present invention and the advantages thereof, reference should be made to the following Detailed Description taken in conjunction with the accompanying drawings in which:

FIG. 1 illustrates the VPSA cycle for the production of oxygen from air disclosed in Smolarek et al., U.S. Pat. No. 6,010,555;

DETAILED DESCRIPTION

Figure 2:
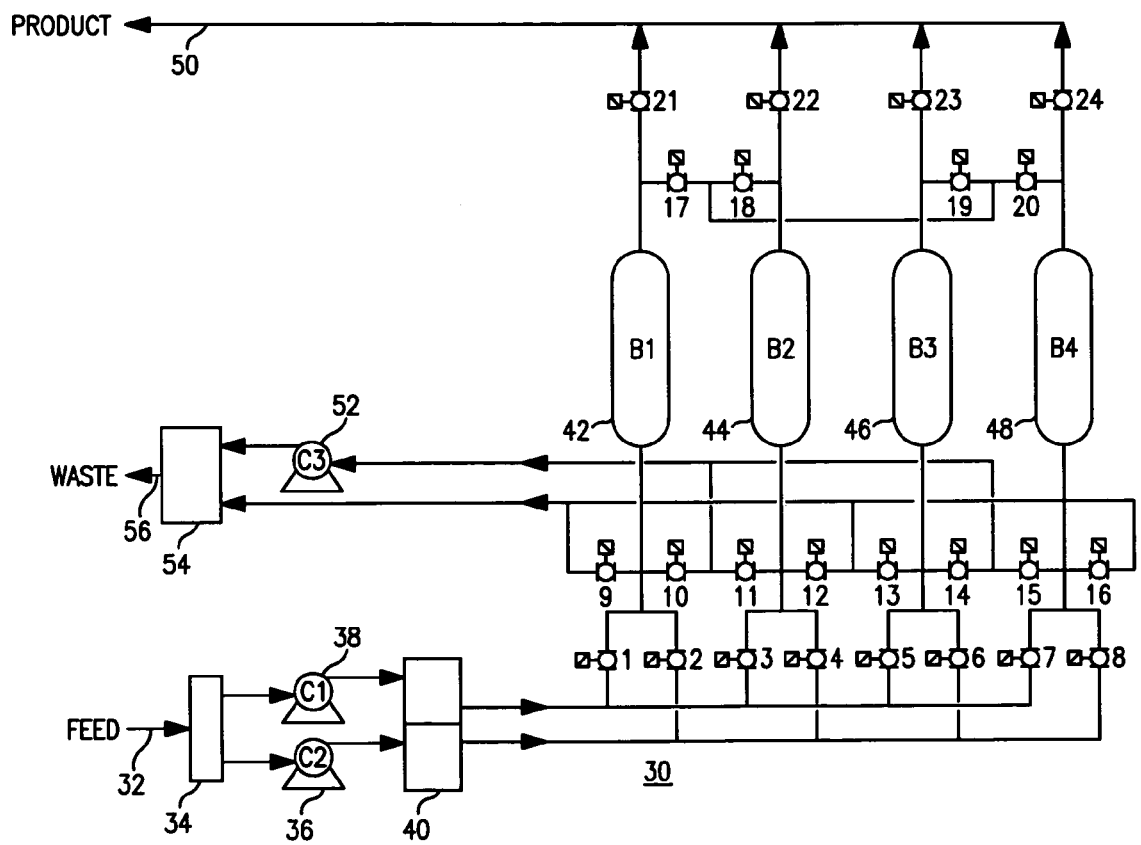
FIG. 2 illustrates a schematic of a four bed process using two compressors to deliver the total feed to a dual inlet feed VPSA process in accordance with the present invention.

As discussed hereinabove, the present invention relates to vacuum pressure swing adsorption (VPSA) processes and apparatus for large scale (preferably >350 tons/day) oxygen production. The present invention includes systems and processes in which twelve-step VPSA cycles are carried out employing four adsorption beds, at least one feed compressor (preferably two, e.g., one centrifugal and one positive displacement such as Roots), and a single vacuum pump. At any instant in time, two of the beds are simultaneously in the feed mode while the other two beds are in the regeneration/refluxing mode. Feed to these two beds can be supplied from separate compressors or from a single compressor. Gas generated during a co-current depressurization step can be sent as purge gas to another bed without the use of any additional storage tank. At any given time, only one bed is in the evacuation step, thereby allowing the use of only one vacuum pump which results in capital and operating cost savings. The evacuation step is carried out before and after the purging step. This mode of operation allows flexibility in the VPSA cycle to enable the use of void space gas, obtained during co-current depressurization of another bed, for purging of the bed directly (without using an additional storage tank) or to avoid using product quality gas for purging.

In addition, the steps of the four bed VPSA process provided in accordance with the present invention are fully integrated so that none of the beds has any idle step(s), i.e. 100% utilization of the compressor(s) and vacuum pump in the VPSA cycle.

While not to be construed as limiting, systems of the present invention can include some or all of the following advantageous features. For example, the present invention includes the application of a single train four bed VPSA process rather than two trains of two bed VPSA processes for large scale $O_2$ production. As a result, lower capital cost and enhanced process performance, e.g., higher $O_2$ recovery, relative to parallel trains of two bed VPSA processes can be expected. In addition, systems of the present invention are expected to have less spreading of the impurity (e.g. $N_2$) concentration fronts as a result of the novel four bed VPSA cycles. This is due to the expectation that less purge gas will be required during bed regeneration relative to prior art techniques. Continuous product, feed and evacuation steps in the cycle allow for 100% utilization of the compressor(s)/vacuum pumps. The present invention further provides for the application of dual feed inlet at any instant during the VPSA cycle. Moreover, the incorporation of a counter-current blow down step in the VPSA cycle can allow a portion of the waste (obtain during bed regeneration) to bypass the vacuum pump instead of having the waste go through the vacuum pump as in U.S. Pat. Nos. 5,656,068 and 6,010,555.

The present invention additionally includes cleaner gas used for refluxing. For example, the lowest $O_2$ purity gas is used for purging and the highest $O_2$ purity gas is used for product pressurization, i.e., product gas of increasing purity is being used for purging, equalization rising and product pressurization in the VPSA cycle of the present invention, thereby resulting in sharper $O_2$ concentration fronts or better bed regeneration prior to bringing the bed online for $O_2$ production.

A further advantage of the present invention is expected due to a higher pressure gradient driving force for void gas recovery during bed-to-bed equalization and the unique arrangements of the various steps in the VPSA cycle relative to prior art systems.

Furthermore, there can be less feed blow by or during feed pressurization because the equalizing bed starts at the adsorption pressure during the overlapping of the equalization and feed pressurization step of the VPSA cycle.

In the present invention, all of the purging gas can come from void space gas recovered from another bed that is undergoing co-current depressurization step. In addition, this purging gas can be used directly for another bed undergoing the purging step without the use of any additional storage tank (as in for example U.S. Pat. No. 5,997,612). The purging step is sandwiched between the evacuation steps in the VPSA cycle. More specifically, the VPSA cycle has evacuation steps before and after the purging step to allow using void space gas for purging of another bed directly or to avoid using product quality gas for purging as in U.S. Pat. No. 5,656,068 and U.S. Pat. No. 6,010,555.

Systems of the present invention further provide the option of using the same or different compressors (e.g., centrifugal and Roots or positive displacement) for compressing the inlet feed to the VPSA process and 100% utilization, i.e., no compressor unloading throughout the VPSA cycle.

As a result of the present invention, about 10-20% improvement in $O_2$ productivity or recovery and about 5-10% reduction in capital cost is expected due to production of oxygen on a large scale (>350 tons/day) using a single train, one less pump, lower bed size factor (BSF), and avoiding the use of product quality gas for purging.

The present invention will now be described with reference to the four bed VPSA process shown in FIG. 2, the four bed VPSA cycle shown in FIG. 3, and the valve switching logic as shown in Table 1.

The four bed VPSA system (30) shown in FIG. 2 includes four adsorber beds (42, 44, 46, 48), 24 ON/OFF valves (some or all of which may or may not have flow control), two feed compressors 36, 38, one vacuum compressor 52, feed inlet silencer/filter 34 for feed 32, feed discharge silencer/after-cooler (40), vacuum discharge silencer 54 and associated piping and fittings. Referring to FIGS. 2 and 3 and Table 1, one embodiment of the present invention is illustrated over one complete VPSA cycle. In Table 1, it will be appreciated that "C" represents valves in the closed position while "O" represents valves in the fully opened or partially opened position, depending on whether the valve is an ON/OFF or flow control valve for manipulating the desired flow. It will be appreciated by those skilled in the art that flow control valves will be used during product pressurization (for example, step 3 in FIG. 3).

allow product 50 out of the top of bed 48. Feed gas is supplied to bed 48 from compressor 36 (C2).

Step No. 2

At the start of step 2, valve 1 closes and valve 2 opens to allow feed gas from compressor 36 (C2) into the bottom of bed 42. Valve 21 remains open to allow product production to continue from bed 42. Valve 11 closes and valve 3 opens to stop the evacuation of bed 44 and allow feed gas from compressor 38 (C1) to enter the bottom of bed 44. Also, valves 18 and 20 open to allow equalization gas to flow from bed 48 into the top of bed 44. Valve 13 closes and valve 14 opens to start the evacuation of bed 46 (B3).

TABLE 1

Valve Firing Sequence for twelve step four bed oxygen VPSA Process.

| | Step | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Bed 1 | AD1 | AD2 | AD3/PPP | AD4 | ED | PPG | BD | EV1 | PG/EV2 | EV3 | EU/FP | PP/FP |
| Bed 2 | EV3 | EU/FP | PP/FP | AD1 | AD2 | AD3/PPP | AD4 | ED | PPG | BD | EV1 | PG/EV2 |
| Bed 3 | BD | EV1 | PG/EV2 | EV3 | EU/FP | PP/FP | AD1 | AD2 | AD3/PPP | AD4 | ED | PPG |
| Bed 4 | AD4 | ED | PPG | BD | EV1 | PG/EV2 | EV3 | EU/FP | PP/FP | AD1 | AD2 | AD3/PPP |
| Valve No. | | | | | | | | | | | | |
| 1 | O | C | C | C | C | C | C | C | C | C | O | O |
| 2 | C | O | O | O | C | C | C | C | C | C | C | C |
| 3 | C | O | O | O | C | C | C | C | C | C | C | C |
| 4 | C | C | C | C | O | O | O | C | C | C | C | C |
| 5 | C | C | C | C | O | O | O | C | C | C | C | C |
| 6 | C | C | C | C | C | C | C | O | O | O | C | C |
| 7 | C | C | C | C | C | C | C | O | O | O | C | C |
| 8 | O | C | C | C | C | C | C | C | C | C | O | O |
| 9 | C | C | C | C | C | C | O | C | C | C | C | C |
| 10 | C | C | C | C | C | C | C | O | O | O | C | C |
| 11 | O | C | C | C | C | C | C | C | C | C | O | O |
| 12 | C | C | C | C | C | C | C | C | C | O | C | C |
| 13 | O | C | C | C | C | C | C | C | C | C | C | C |
| 14 | C | O | O | O | C | C | C | C | C | C | C | C |
| 15 | C | C | C | C | O | O | O | C | C | C | C | C |
| 16 | C | C | C | O | C | C | C | C | C | C | C | C |
| 17 | C | C | C | C | O | O | C | C | O | C | O | C |
| 18 | C | O | C | C | C | C | C | O | O | C | C | O |
| 19 | C | C | O | C | O | C | C | C | C | C | O | O |
| 20 | C | O | O | C | C | O | C | O | C | C | C | C |
| 21 | O | O | O | O | C | C | C | C | C | C | C | O |
| 22 | C | C | O | O | O | O | O | C | C | C | C | C |
| 23 | C | C | C | C | C | O | O | O | O | O | C | C |
| 24 | O | C | C | C | C | C | C | C | O | O | O | O |

AD: Adsorption/Product Production
ED: Equalization Down
PPG: Provide Purge Gas
PPP: Provide Product Pressurization Gas
BD: Blowdown
EV: Evacuation
PG: Receive Purge
EU: Equalization Up
PP: Product Pressurization
FP: Feed Pressurization Step No. 1

At the start of step 1, the pressure in bed 42 (B1) is at the adsorption pressure. Valve 1 is open to allow feed gas into the bottom of bed 42 and valve 21 is open to low product 50 out of the top of bed 42. Feed gas is applied to Bed 1 from compressor 38 (C1). Valve 11 is en to allow evacuation of bed 44 (B2) thru compressor 52 (C3) to vacuum discharge silencer 54 to waste 56. Valve 13 opens to allow bed 46 (B3) to blowdown to the atmosphere. Valve 8 is open to allow feed gas into the bottom of bed 48 (B4) and valve 24 is open to Step No. 3

At the start of step 3, valves 2 and 21 remain open to allow product 50 production to continue from bed 42. Valve 3 remains open and allows feed gas from compressor 38 to continue to enter the bottom of bed 44. Valve 22 opens to allow product pressurization gas to enter the top of bed 44. Valve 20 remains open and valve 19 opens to allow purge gas to flow from bed 48 to bed 46. Valve 14 remains open to continue the evacuation of bed 46. Valve 18 closes.

Step No. 4

At the start of step 4, valves 2 and 21 remain open to allow product production to continue from bed 42. Valves 3 and 22 remain open and product production begins in bed 44. Valve 14 remains open to continue the evacuation of bed 46. Valve 16 opens to allow bed 48 to blowdown to the atmosphere.

Step No. 5

At the start of step 5, valves 17 and 19 open to allow equalization gas to flow from bed 42 into the top of bed 46. Valve 3 closes and valve 4 opens to allow feed gas from compressor 36 (C2) into the bottom of bed 44. Valve 22 remains open to allow product production to continue from bed 44. Valve 13 closes and valve 5 opens to stop the evacuation of bed 46 and allow feed gas from compressor 38 (C1) to enter the bottom of bed 46. Valve 16 closes and valve 15 opens to start the evacuation of bed 48.

Step No. 6

At the start of step 6, valve 17 remains open and valve 20 opens to allow purge gas to flow from bed 42 to bed 48. Valves 4 and 22 remain open to allow product production to continue from bed 44. Valve 5 remains open and allows feed gas from compressor 38 (C1) to continue to enter the bottom of bed 46. Valve 23 opens to allow product pressurization gas to enter the top of bed 46. Valve 15 remains open to continue the evacuation of bed 48 while it receives purge gas. Valve 19 closes.

Step No. 7

At the start of step 7, valve 9 opens to allow bed 42 to blowdown to the atmosphere. Valves 4 and 22 remain open to allow product production to continue from bed 44. Valves 5 and 23 remain open and product production begins in bed 46. Valve 15 remains open to continue the evacuation of bed 48.

Step No. 8

At the start of step 8, valve 9 closes and valve 10 opens to start the evacuation of bed 42. Valves 18 and 20 open to allow equalization gas to flow from bed 44 into the top of bed 48. Valve 5 closes and valve 6 opens to allow feed gas from compressor 36 (C2) into the bottom of bed 46. Valve 23 remains open to allow product production to continue from bed 46. Valve 15 closes and valve 7 opens to stop the evacuation of bed 48 and allow feed gas from compressor 38 (C1) to enter the bottom of bed 48.

Step No. 9

At the start of step 9, valve 10 remains open to continue the evacuation of bed 42 while it receives purge gas. Valve 18 remains open and valve 17 opens to allow purge gas to flow from bed 44 to bed 42. Valves 6 and 23 remain open to allow product production to continue from bed 46. Valve 7 remains open and allows feed gas from compressor 38 (C1) to continue to enter the bottom of bed 48. Valve 24 opens to allow product pressurization gas to enter the top of bed 48. Valve 20 closes.

Step No. 10

At the start of step 10, valve 10 remains open to continue the evacuation of bed 42. Valve 12 opens to allow bed 44 to blowdown to the atmosphere. Valves 6 and 23 remain open to allow product production to continue from bed 46. Valves 7 and 24 remain open and product production begins in bed 48.

Step No. 11

At the start of step 11, valve 10 closes and valve 1 opens to stop the evacuation of bed 42 and allow feed gas from compressor 38 (C1) to enter the bottom of bed 42. Valve 12 closes and valve 11 opens to start the evacuation of bed 44. Valves 17 and 19 open to allow equalization gas to flow from bed 46 into the top of bed 42. Valve 7 closes and valve 8 opens to allow feed gas from compressor 36 (C2) into the bottom of bed 48. Valve 24 remains open to allow product production to continue from bed 48.

Step No. 12

At the start of step 12, valve 1 remains open and allows feed gas from compressor 38 (C1) to continue to enter the bottom of bed 42. Valve 21 opens to allow product pressurization gas to enter the top of bed 42. Valve 11 remains open to continue the evacuation of bed 44 while it receives purge gas. Valve 19 remains open and valve 18 opens to allow purge gas to flow from bed 46 to bed 44. Valves 8 and 24 remain open to allow product production to continue from bed 48. Valve 17 closes.

The embodiment described hereinabove utilizes two compressors to deliver feed gas to the VPSA vessels. In a preferred embodiment, one Roots compressor 38 (C1 or compressor 1) and one centrifugal compressor 36 (C2 or compressor 2) will deliver the total feed flow to an integrated four bed VPSA process. In addition, in the preferred mode of operation for large scale $O_2$ production, radial beds are used in the VPSA process. Additional details of radial bed adsorbers are given by Ackley et al., U.S. Pat. No. 6,506,234 B1.

Figure 3:
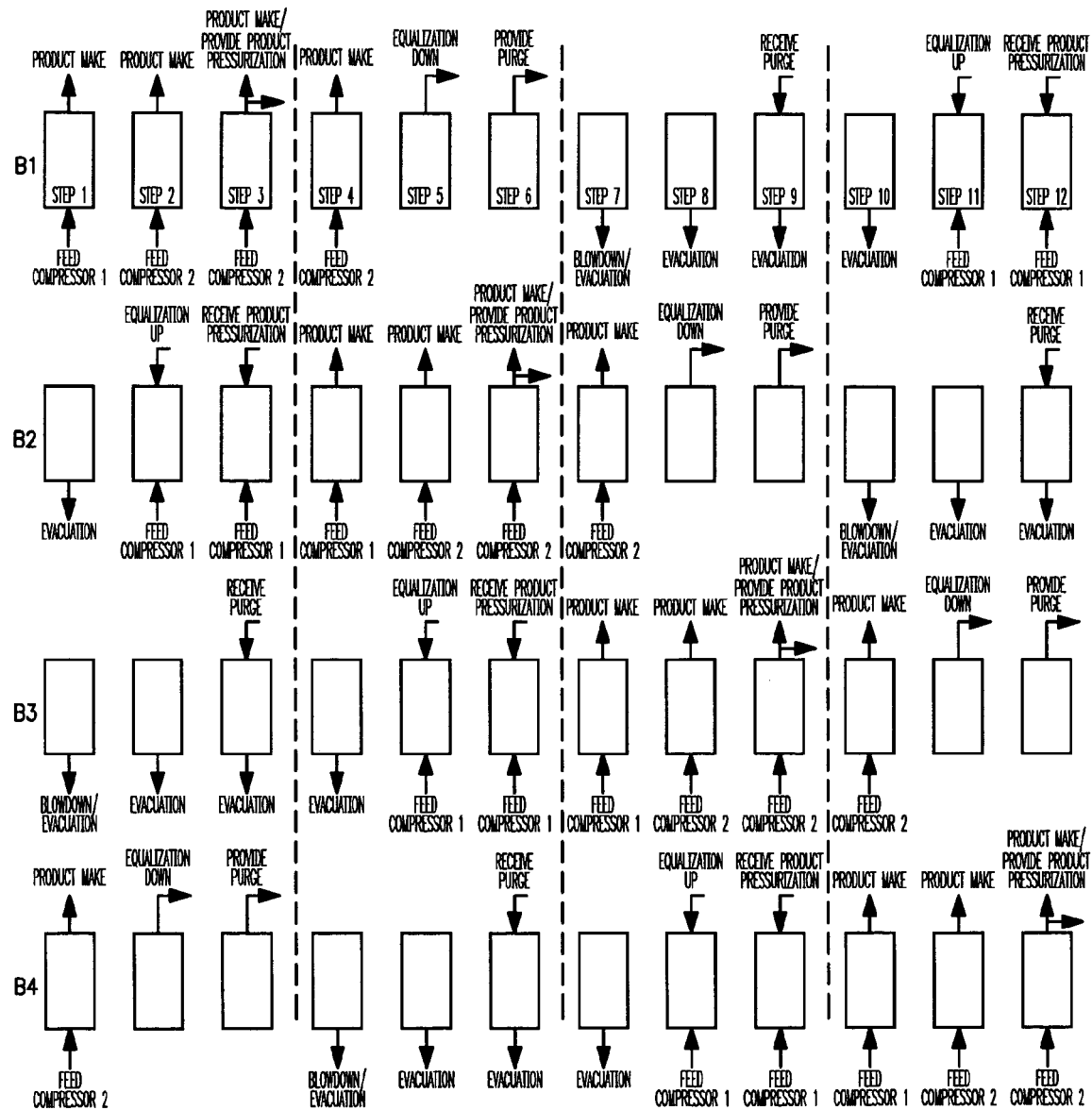
FIG. 3 shows a column cycle for the dual feed inlet four bed VPSA process of FIG. 2.

Referring to the bed 42 (B1) steps in FIG. 3, if two different compressors (e.g., Roots and centrifugal) are used, then in the preferred mode of operation, the Roots compressor is used in steps 1, 11, and 12, while the centrifugal compressor is used in steps 2, 3 and 4. Referring to FIGS. 2 and 3, during step 1 of the VPSA cycle, one portion of the total feed (dual feed VPSA process) is delivered via the Roots compressor to bed 42 (B1) while the centrifugal compressor delivers the other portion of the total feed to bed 48 (B4). It is also noted that at any instant, two beds are receiving feed gas simultaneously and a continuous product make exists throughout the VPSA cycle.

Table 2 gives an example of the operating conditions and the VPSA process performance using a nitrogen selective adsorbent in the beds. In the Table, the symbols have the following meaning: TPD=ton (2000 lb) per day of oxygen, kPa=1000 Pa=S.I. unit for pressure (1.0 atm.=101.323 kPa), s=time unit in seconds.

In addition, the nitrogen equilibrium selective adsorbent in Table 2 is highly exchanged Li—X (>95% Li), as disclosed by Chao et al., U.S. Pat. Nos. 5,413,625 and 4,859,217, both of which are incorporated herein by reference to the extent consistent herewith. Although highly exchanged LiX adsorbent is disclosed in these patents, it is anticipated that layers of adsorbents or mixtures of adsorbents could be used and may preferably be used (e.g., when there is moisture in the air) in each bed of the VPSA process without deviating from the scope of this invention. Representative examples of various adsorbents for use in this invention include but not limited to those disclosed in U.S. Pat. Nos. 6,027,548 and 6,790,260 B2, both of which are incorporated herein by reference to the extent consistent herewith. See also, U.S. Pat. Nos. 6,743,745 B2; 6,506,234 B1; 6,500,234; 6,471,748 B1; and 6,780,806. The adsorbent could be a mixture of adsorbents or a layered adsorbent(s). Preferably, the same adsorbent, whether it is a single adsorbent, mixture of adsorbents or layer of adsorbent(s), is the same in all four beds.

Table 2: Large scale (>350 TPD) $O_2$ production example (FIGS. 2-3, operating conditions and performance). Each of the four beds contains Li—X zeolite for $N_2$ removal. The results shown below were obtained from VPSA simulation and pilot plant experiments using dry air containing 0.934% Ar, 78.12% $N_2$ and 20.95% $O_2$.

Adsorbent in each Bed: . . . Li—X
Feed Composition ($N_2/O_2$/Ar): . . . 78.12%/20.95% $O_2$/0.934%
High Pressure: . . . 160 kPa
Low Pressure: . . . 30 kPa
Total Feed: . . . $2.85 \times 10^6$ NCFH
Amount of 02 Produced: . . . $3.58 \times 10^5$ NCFH (355 TPD $O_2$)
Oxygen Purity: . . . 90%
Overall oxygen Recovery: . . . 60%
Bed Size Factor: . . . 350 lb/TPD $O_2$
Temperature . . . 300K The VPSA process discussed hereinabove is focused on $O_2$ production from air using a four VPSA bed process and system. In alternative embodiments of the present invention, less than four (e.g., three bed) or more than four beds could be used. In such embodiments, one would need to develop the appropriate three bed VPSA cycles or >4 bed VPSA cycles to incorporate the aforementioned features of the present invention. In addition, additional storage tanks may or may not be required in such alternative embodiments to incorporate the features of the invention depending on whether three or >4 beds in the VPSA cycles are employed.

Moreover, each bed could alternatively include one or several layers of adsorbents, or a mixture of adsorbents. Various kinds of adsorbents could also be used in the VPSA process for $O_2$ production from air. Details of preferred suitable adsorbents and layering of the adsorbents are disclosed in U.S. Pat. Nos. 5,413,625; 4,859,217; 6,027,548; and 6,790,260 B2. In other modes of operation, other adsorbents could be used in the aforementioned VPSA processes of the present invention. For example, 5A, 13X, CaX, and mixed cations zeolites could be used as the $N_2$ selective adsorbent in the VPSA process.

In the preferred and alternative modes of operation, a prepurifier section is positioned at the upstream end of each zeolite bed to remove water and carbon dioxide from the feed air. For example and while not to be construed as limiting, a layer of alumina or silica is preferably positioned upstream of each of the adsorbent beds to remove water and carbon dioxide from the feed air prior to passing to the $N_2$ selective adsorbent in the VPSA process.

The adsorber configuration selected (e.g., radial, axial, structured, etc.) and choice and arrangement of the adsorbents will be determined based on the size of the feed flow, the type of feed source, and VPSA process operating conditions. In an alternative mode of operation for example, axial beds can be used in the VPSA process. It is preferred that all the beds have the same configuration.

In yet other alternative modes of operation, one compressor (rather than two compressors) could be used to deliver the total feed to the dual inlet VPSA process (e.g., the VPSA processes illustrated in the Figures).

In some modes of operation, the highest adsorption pressure is in the range of 100 kPa to about 2000 kPa, and the lowest desorption pressure is in the range of 20 kPa to about 100 kPa. In addition, the optimization between achieving high $O_2$ recovery and low power consumption in the VPSA process will determine optimum adsorption and desorption pressures for a given adsorbent. The average purity of the oxygen product is expected to be in the range of 85 percent oxygen to about 95 percent oxygen, corresponding to an expected $O_2$ recovery of about 55-75%. The lowest $O_2$ recovery is expected to correspond to the highest the $O_2$ purity, and vice versa.

Figure 4:
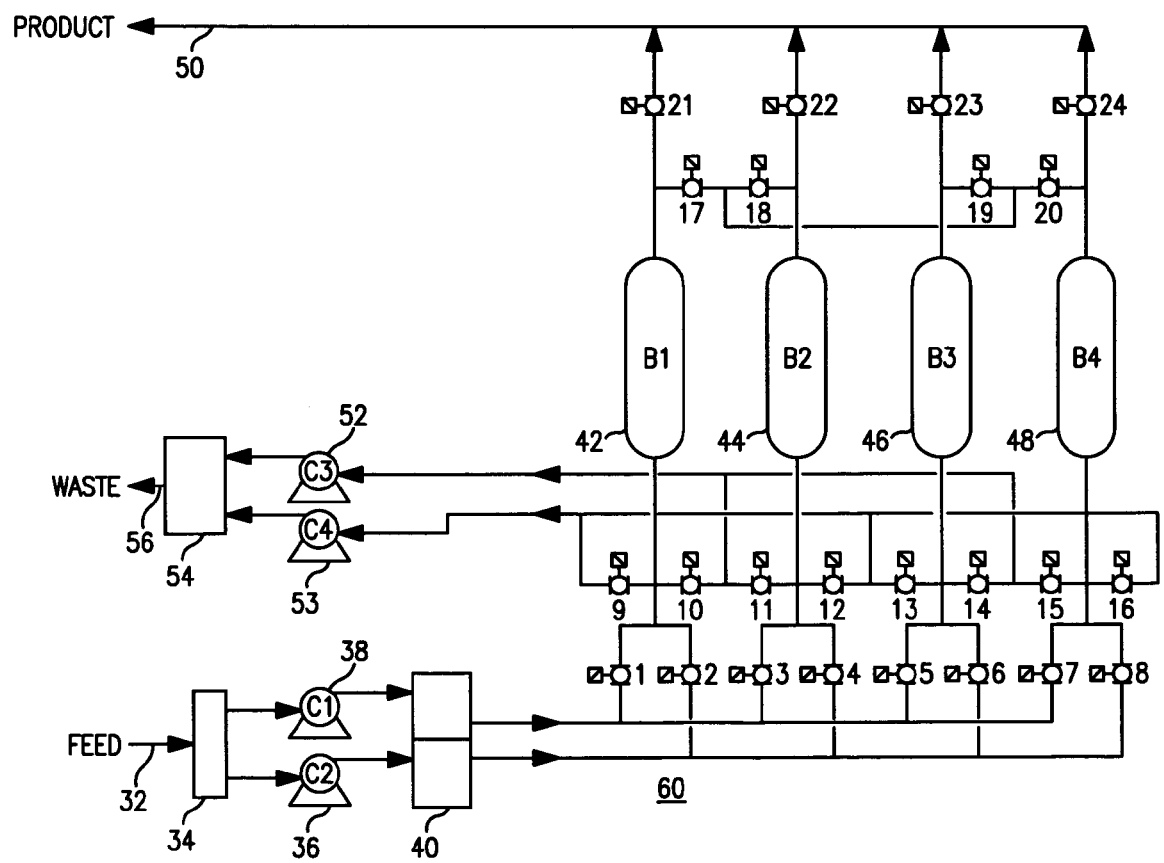
FIG. 4 illustrates a four bed VPSA process using two compressors to deliver the total feed to a dual inlet feed VPSA process in accordance with an alternative embodiment of the present invention.
Figure 5:
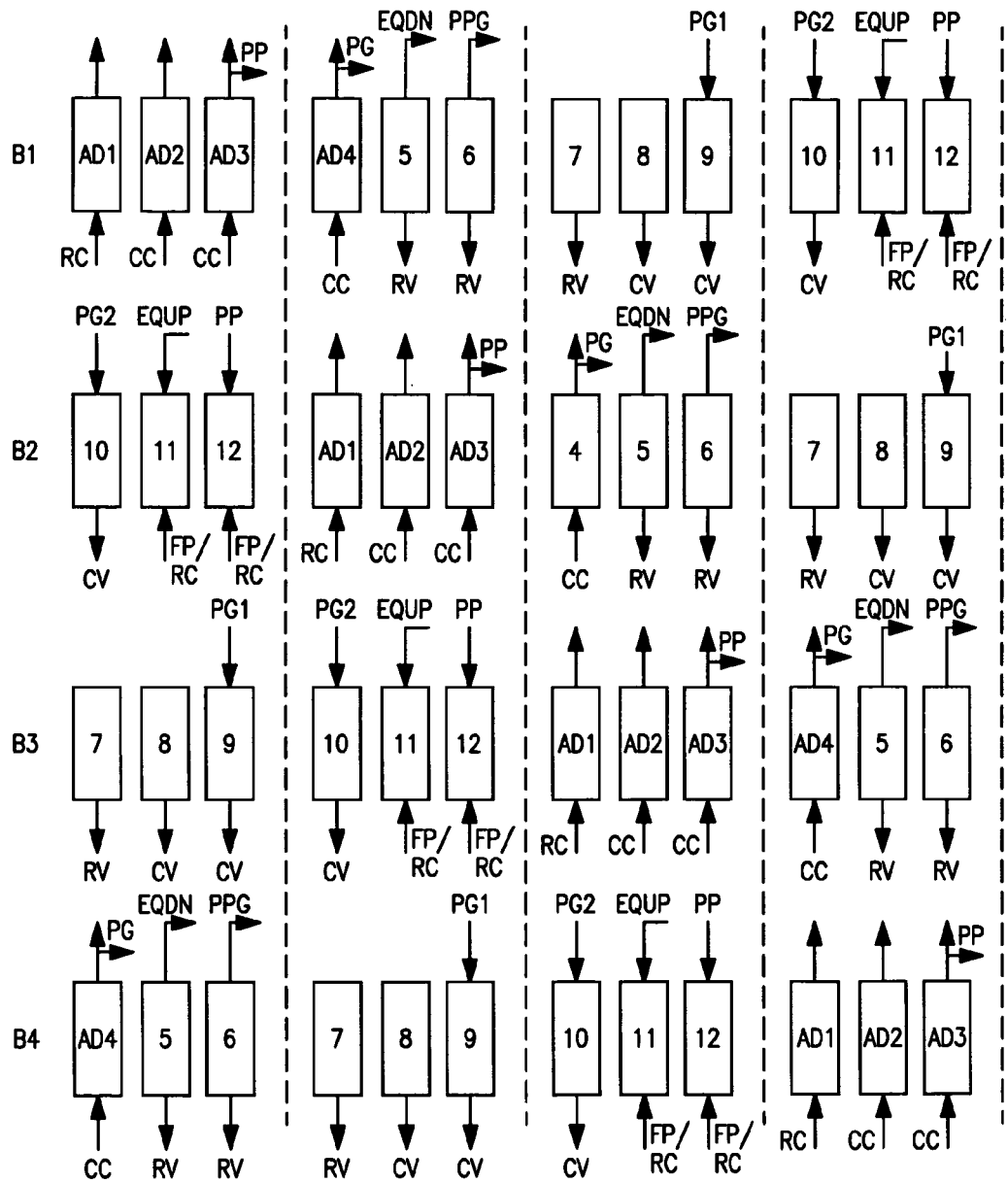
FIG. 5 shows a column cycle for the dual feed inlet four bed VPSA process of FIG. 4.

In alternative modes of operation, other processes and cycles could be used. For example, FIG. 4 shows an alternate schematic of a four bed system 60 and process using two compressors 36, 38 to deliver the total feed 32 to the dual inlet feed VPSA process and two compressors 52, 53 to evacuate the waste 56 from the VPSA process. In the preferred mode of operation only one vacuum blower 52 (preferably, a Roots type blower) is used to evacuate the waste. In this alternative mode, a first vacuum blower 52 is used to evacuate the waste (preferably a Roots type blower) followed by a second vacuum blower 53 (preferably a centrifugal type blower). FIG. 5 shows the column cycle for the dual feed inlet four bed VPSA process of FIG. 4. In this alternative mode, an additional purge gas, obtained from another bed in the adsorption step (e.g., bed 42 (B1) undergoing AD4 in FIG. 5 while simultaneously supplying purge gas to another bed), is utilized in the VPSA process. In addition, the equalization down step in this alternative mode is overlapped with a countercurrent evacuation to hasten bed depressurization. Also, during the provide purging step (e.g., bed 42 (B1) in step 6 of FIG. 5), the bed is simultaneously undergoing countercurrent evacuation.

Referring to FIGS. 4 and 5 and Table 3, an alternative embodiment of the present invention is illustrated over one complete VPSA cycle. In Table 3, AD represents Adsorption/Product Production, ED: Equalization Down, PPG: Provide Purge Gas, PPP: Provide Product Pressurization Gas, BD: Blowdown, PG: Receive Purge, EU: equalization up (EU is the same as EQUP), PP: product Pressurization, FP: Feed Pressurization, RC: Roots Compressor, CC: Centrifugal Compressor, RV: Roots Vacuum, CV: Centrifugal Vacuum, EV: Evacuation. As discussed above with reference to Table 1, it will be appreciated that in Table 3, "C" represents valves in the closed position while "O" represents valves in the opened or partially opened position, depending on whether the valve is an ON/OFF or flow control valve for manipulating the desired flow. It will also be appreciated by those skilled in the art that flow control valves will be used during product pressurization (for example, step 3 in FIG. 5).

TABLE 3

Valve Firing Sequence for twelve step four bed oxygen VPSA Process.

| | Step | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Bed 1 | AD1 (RC) | AD2 (CC) | AD3 (CC)/PPP | AD4 (CC)/PPG | ED/EV1 (RV) | PPG/EV2 (RV) | EV3 (RV) | EV4 (CV) | PG1/EV5 (CV) | PG2/EV6 (CV) | EU/FP (RC) | PP/FP (RC) |
| Bed 2 | PG2/EV6 (CV) | EU/FP (RC) | PP/FP (RC) | AD1 (RC) | AD2 (CC) | AD3 (CC)/PPP | AD4 (CC)/PPG | ED/EV1 (RV) | PPG/EV2 (RV) | EV3 (RV) | EV4 (CV) | PG1/EV5 (CV) |
| Bed 3 | EV3 (RV) | EV4 (CV) | PG1/EV5 (CV) | PG2/EV6 (CV) | EU/FP (RC) | PP/FP (RC) | AD1 (RC) | AD2 (CC) | AD3 (CC)/PPP | AD4 (CC)/PPG | ED/EV1 (RV) | PPG/EV2 (RV) |

TABLE 3-continued

Valve Firing Sequence for twelve step four bed oxygen VPSA Process.

| | Step 1 | Step 2 | Step 3 | Step 4 | Step 5 | Step 6 | Step 7 | Step 8 | Step 9 | Step 10 | Step 11 | Step 12 |
|---|---|---|---|---|---|---|---|---|---|---|---|---|
| Bed 4 | AD4 (CC)/PPG | ED/EV1 (RV) | PPG/EV2 (RV) | EV3 (RV) | EV4 (CV) | PG1/EV5 (CV) | PG2/EV6 (CV) | EU/FP (RC) | PP/FP (RC) | AD1 (RC) | AD2 (CC) | AD3 (CC)/PPP |
| Valve No. | | | | | | | | | | | | |
| 1 | O | C | C | C | C | C | C | C | C | C | O | O |
| 2 | C | O | O | O | C | C | C | C | C | C | C | C |
| 3 | C | O | O | O | C | C | C | C | C | C | C | C |
| 4 | C | C | C | C | O | O | O | C | C | C | C | C |
| 5 | C | C | C | C | O | O | O | C | C | C | C | C |
| 6 | C | C | C | C | C | C | C | O | O | O | C | C |
| 7 | C | C | C | C | C | C | C | O | O | O | C | C |
| 8 | O | C | C | C | C | C | C | C | C | C | O | O |
| 9 | C | C | C | C | O | O | O | C | C | C | C | C |
| 10 | C | C | C | C | C | C | C | O | O | O | C | C |
| 11 | O | C | C | C | C | C | C | C | C | C | O | O |
| 12 | C | C | C | C | C | C | C | O | O | O | C | C |
| 13 | O | C | C | C | C | C | C | C | C | C | O | O |
| 14 | C | O | O | O | C | C | C | C | C | C | C | C |
| 15 | C | C | C | C | O | O | O | C | C | C | C | C |
| 16 | C | O | O | O | C | C | C | C | C | C | C | C |
| 17 | C | C | C | O | O | O | O | C | O | O | O | C |
| 18 | O | O | C | O | C | C | O | O | C | C | C | O |
| 19 | C | C | O | O | O | C | C | C | O | O | O | O |
| 20 | O | O | O | C | C | O | O | O | C | C | C | C |
| 21 | O | O | O | O | C | C | C | C | C | C | C | O |
| 22 | C | C | O | O | O | O | O | C | C | C | C | C |
| 23 | C | C | C | C | C | O | O | O | O | O | C | C |
| 24 | O | C | C | C | C | C | C | C | O | O | O | O |

Suitable adsorbents, mixtures and layering of such adsorbents are discussed hereinabove.

Figure 6:
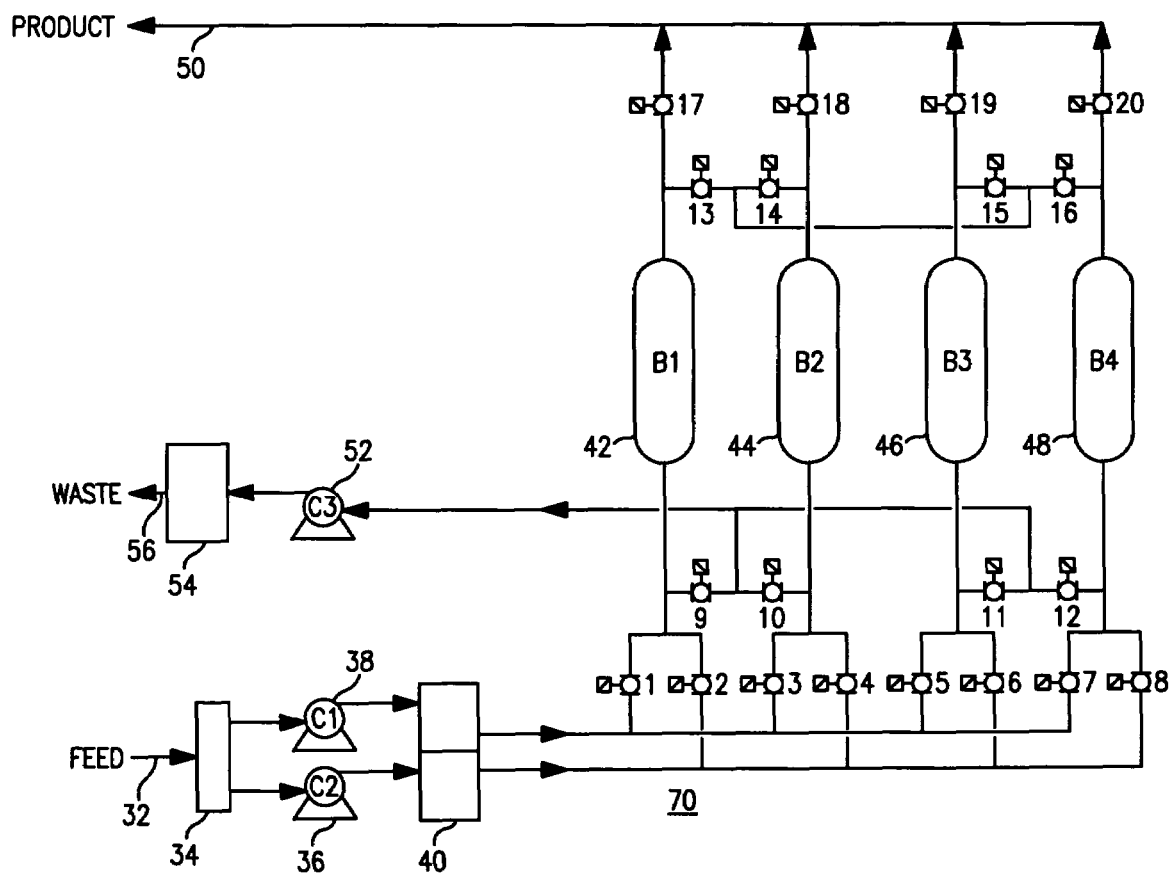
FIG. 6 shows an alternate schematic of a four bed VPSA process using two compressors to deliver the total feed to a dual inlet feed VPSA process in accordance with the present invention.
Figure 7:
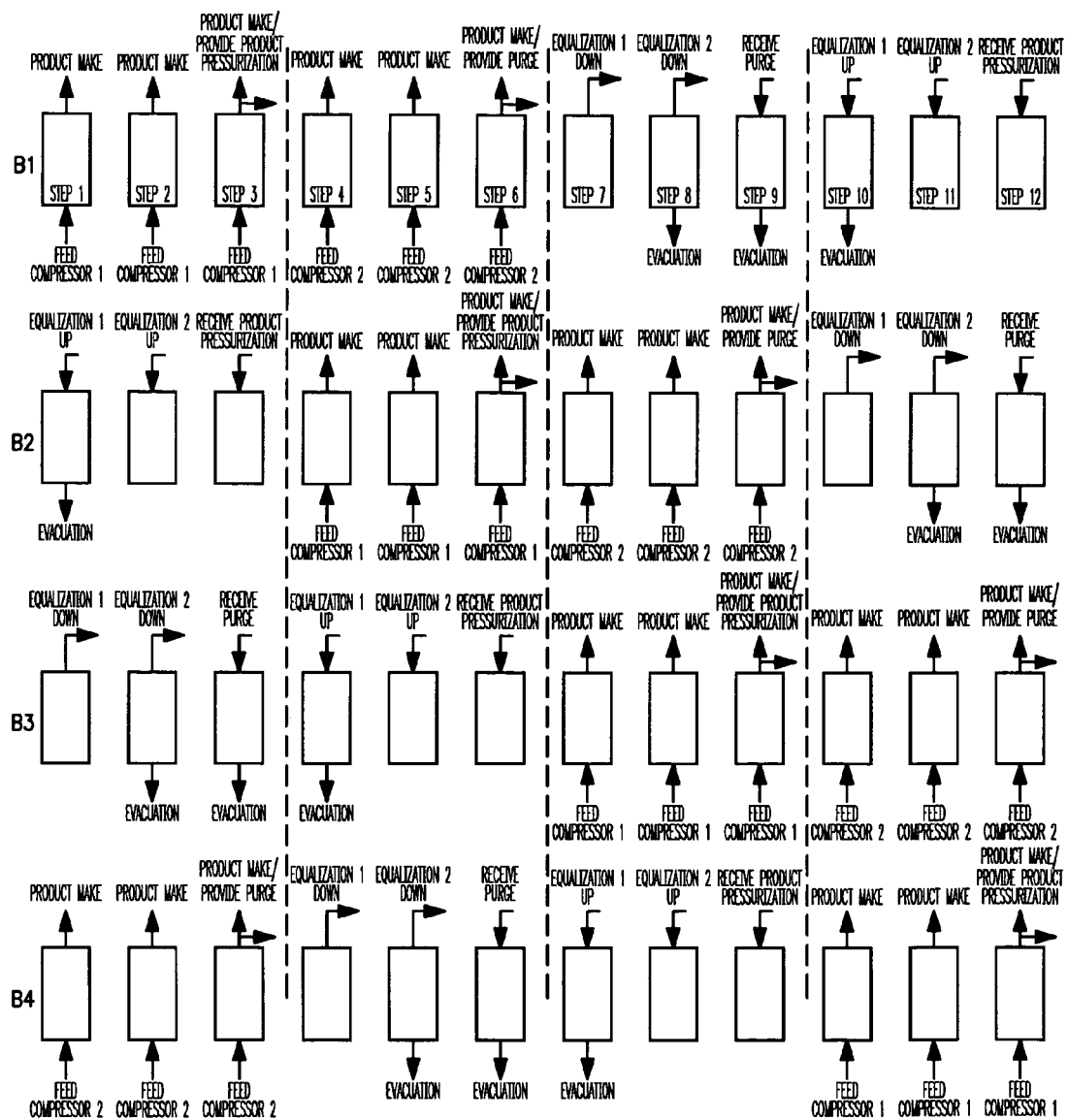
FIG. 7 shows a column cycle for the dual feed inlet four bed VPSA process of FIG. 6.

FIG. 6 shows another alternate schematic of a four bed system 70 and process in accordance with the present invention using two compressors 36, 38 to deliver the total feed to the dual inlet feed VPSA process. FIG. 7 shows a column cycle for the dual feed inlet four bed VPSA process of FIG. 6. In the preferred mode of operation (FIGS. 2 and 3) described hereinabove, eight waste valves are used to allow for a blowdown step (bypassing the vacuum blower) followed by evacuation steps using the vacuum blower. In the alternative mode of operation shown in FIGS. 6 and 7, only four waste valves are required. As a result, all of the waste gas is evacuated through the vacuum blower. In the preferred mode shown in FIGS. 2 and 3, equalization is not overlapped with evacuation as in the alternative mode illustrated in FIGS. 6 and 7. In addition, purge is provided from co-current depressurization gas in the embodiment shown in FIGS. 2 and 3 while purge is provided from the bed in production in the embodiment shown in FIGS. 6 and 7. Further, there is an evacuation step after the purge step in the preferred embodiment shown in FIGS. 2 and 3 while there is no evacuation step following the purge in the alternative embodiment disclosed in FIGS. 6 and 7.

Figure 8:
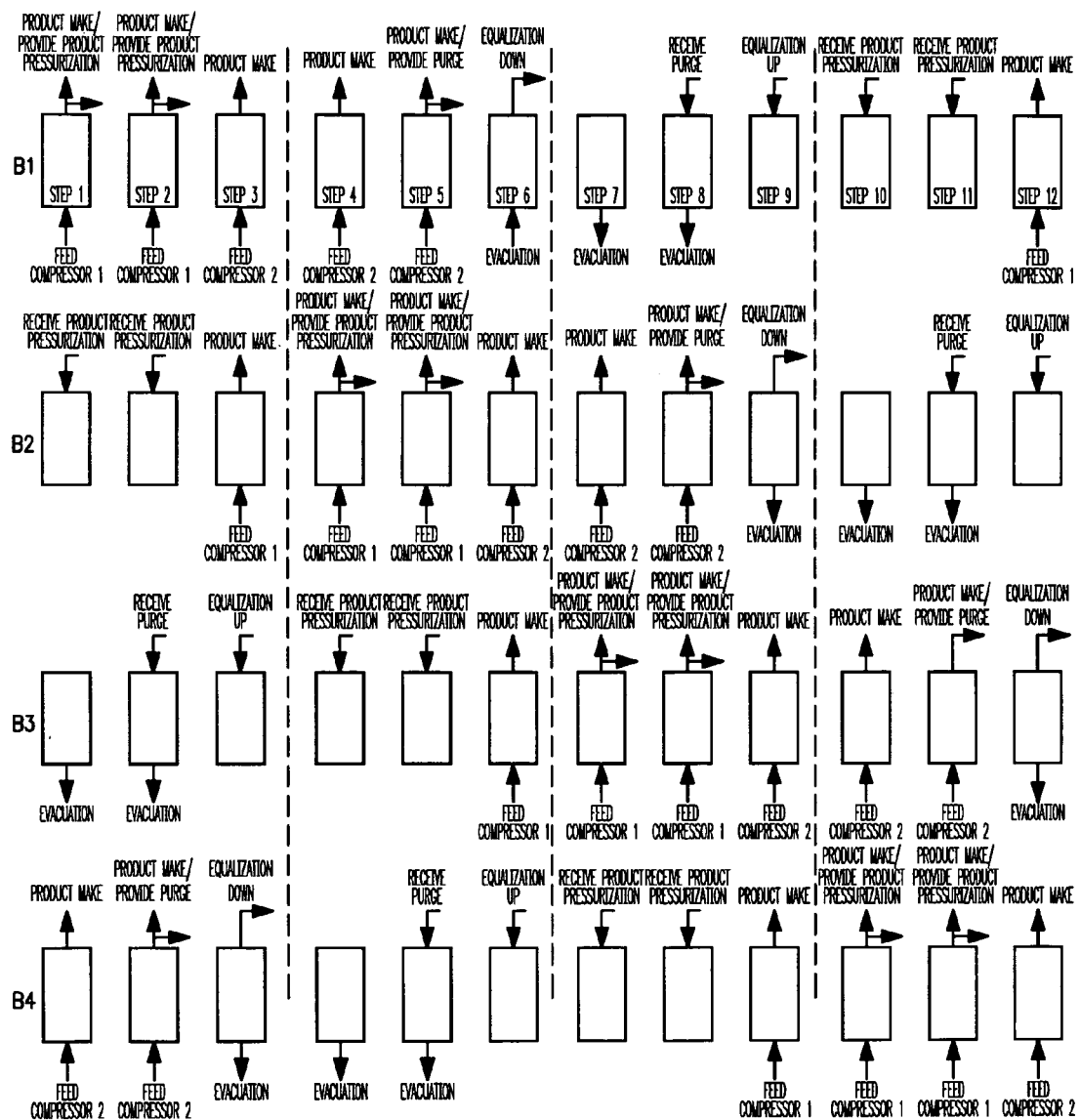
FIG. 8 illustrates an alternative column cycle for the dual feed inlet four bed VPSA process of FIG. 6 in which the cycle uses two product pressurization steps and one equalization step.
Figure 9:
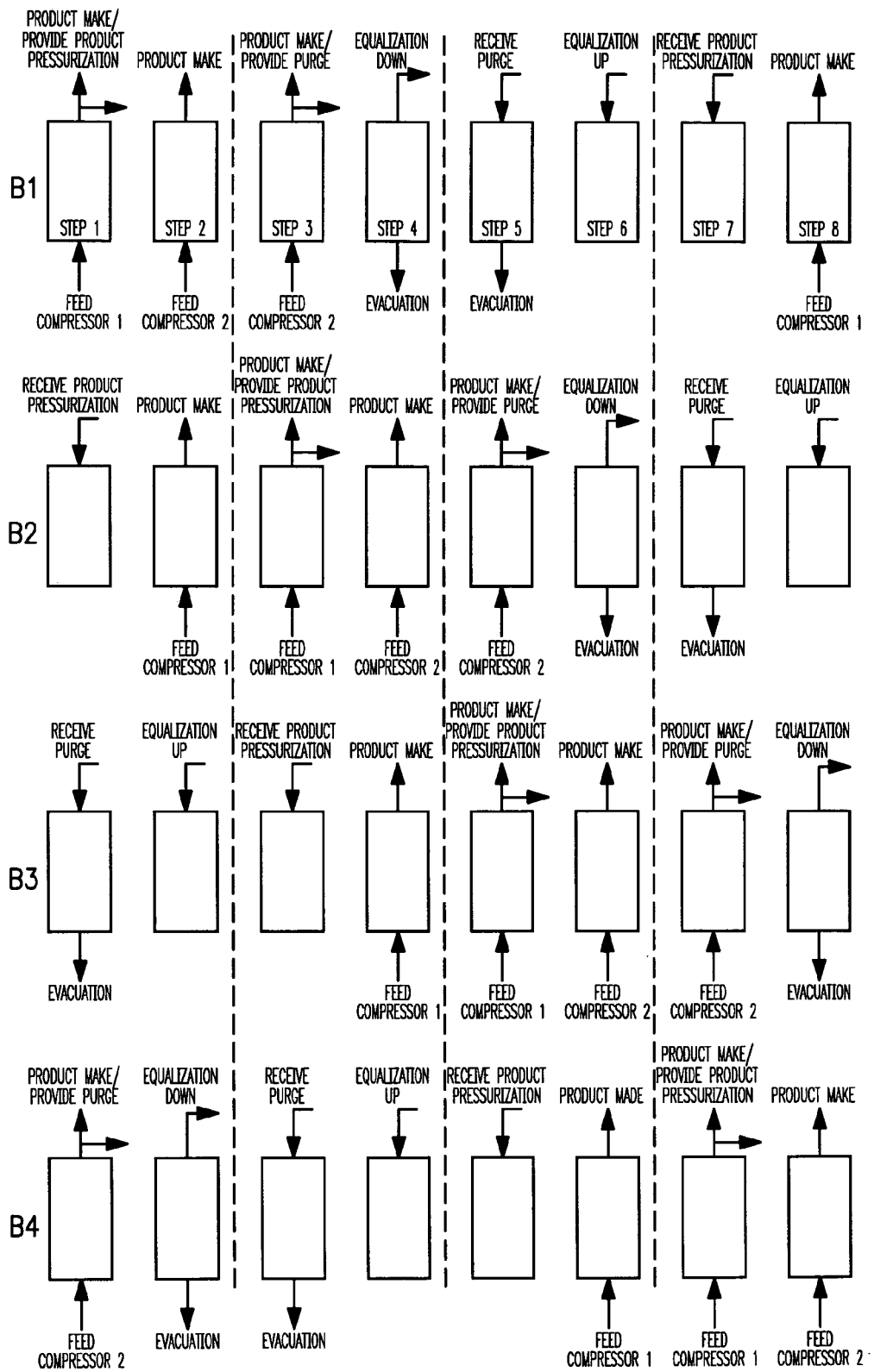
FIG. 9 shows another alternative column cycle for the dual feed inlet four bed VPSA process of FIG. 6 in which the cycle uses eight steps instead of twelve steps.

Additional alternative column cycles for the dual feed inlet four bed VPSA process of FIG. 6 are shown in FIGS. 8 and 9. In particular, the cycle shown in FIG. 8 uses two product pressurization steps and one equalization step and the cycle shown in FIG. 9 uses eight steps instead of twelve steps. The illustrated column cycles for the dual feed inlet four bed VPSA processes shown in FIGS. 2, 4 and 6 and the associated column cycles are arranged in the order from most preferred (FIG. 2-3) to the least preferred (FIGS. 6 and 9). In addition, for the VPSA process of FIG. 6 and the associated column cycles (FIGS. 7-9), the column cycles are arranged in the order of most preferred to least preferred; i.e., the cycle in FIG. 7 is preferred over the cycle shown in FIG. 8, and the cycle shown in FIG. 8 is preferred over the cycle shown in FIG. 9. This is because VPSA $O_2$ recovery and $O_2$ productivity are expected to be less using the cycle shown in FIG. 8 than using the cycle illustrated in FIG. 7 and the $O_2$ recovery is expected to be less using the cycle depicted in FIG. 9 relative to using the cycle shown in FIG. 8.

The column cycles for the dual feed inlet four bed VPSA process of FIG. 6 illustrated in FIGS. 7-9 are expected to vary in bed size factor and power consumption, with the cycle depicted in FIG. 7 being more efficient than that shown in FIG. 8 and the cycle in FIG. 8 being more efficient than that shown in FIG. 9. It is thus expected that the BSF and power consumption are highest for FIG. 9, less for FIG. 8 and even less for FIG. 7 for the schematic in FIG. 6 because the efficiencies for the cycles shown are expected to decrease with increasing figure numbers.

In the VPSA processes and systems discussed hereinabove, it is contemplated to use air as the feed gas to recover oxygen on a large scale basis. Because oxygen can be produced on a large scale (>350 Tons/day) using a single train, one less pump (i.e., one less than using 2 feed and 2 vacuum pumps), lower bed size factor, and avoiding the use of product quality gas for purging, it is expected that there will be about 10-20% improvement in $O_2$ productivity/recovery and 5-10% reduction in capital cost.

The systems and processes of the present invention are likewise expected to be useful for feed streams other than air such as rare gas (e.g., He, Ar, Ne, Kr) containing feed streams or $H_2$-containing feed streams such as those obtained from steam methane reforming reactions or partial oxidation of hydrocarbons, etc. For example and while not be construed as limiting, a $H_2$ containing feed mixture from synthesis gas, generated from steam methane reforming, is expected to be suitable for use in accordance with the present invention. In such an embodiment, hydrogen could be recovered. It is anticipated that the process and system could be adapted quite readily for the desired product or co-products production. For example, co-production of $O_2$ and $N_2$ or $H_2$ and CO could be readily achieved from air feed and $H_2$ containing feed, respectively. Those skilled in the art will recognize that appropriate modifications to the adsorbent, pre-purifier and process operating conditions will be selected based on the intended application.

The systems and processes discussed hereinabove have contemplated the use of VPSA processes to produce oxygen from air. In alternative embodiments of the invention, pressure swing adsorption (PSA) could be utilized, wherein, the operating pressures are above ambient pressure, thus a vacuum pump may not be necessary. In still other embodiments, more than one vacuum pump may be desirable.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A vacuum pressure swing adsorption (VPSA) process for separating a feed supply gas containing at least one more strongly adsorbable component and at least one less strongly adsorbable product gas component, the process comprising: continuously feeding a feed supply gas into feed input ends of each of two adsorber beds, each bed containing at least one adsorbent which preferentially adsorbs the more strongly adsorbable component and withdrawing the at least one less strongly adsorbable product gas component from exit ends of the adsorber beds, producing in cycles by steps in which two beds are simultaneously in a feed mode and two other beds are in a regeneration/refluxing mode, wherein at any instant during the process, only one bed is in an evacuation step using a pump.

2. The vacuum pressure swing adsorption process of claim 1, wherein the VPSA process contains four beds in a single train.

3. The vacuum pressure swing adsorption process of claim 2, wherein the cycles by steps comprise a twelve-step cycle.

4. The vacuum pressure swing adsorption process of claim 3, wherein the evacuation step is performed before and after a purge step.

5. The vacuum pressure swing adsorption process of claim 4, wherein void space gas obtained during cocurrent depressurization of a bed other than the bed undergoing the evacuation is suitable for use as a purge gas.

6. The vacuum pressure swing adsorption process of claim 1, wherein the at least one more strongly adsorbable component comprises nitrogen.

7. The vacuum pressure swing adsorption process of claim 1, wherein the at least one less strongly adsorbable product gas component comprises oxygen.

8. The vacuum pressure swing adsorption process of claim 7, wherein the oxygen has an average purity of about 85-95% oxygen.

9. The vacuum pressure swing adsorption process of claim 7, wherein the oxygen corresponds to an oxygen recovery of about 55-75%.

10. The vacuum pressure swing adsorption process of claim 7, wherein each adsorption bed contains an $N_2$ selective adsorbent.

11. The vacuum pressure swing adsorption process of claim 10, wherein the adsorbent comprises at least one of: Li—X zeolite, 5A, 13X, CaX, and mixed cations zeolites.

12. The vacuum pressure swing adsorption process of claim 11, wherein the adsorbent comprises a LiX adsorbent.

13. The vacuum pressure swing adsorption process of claim 1, wherein the at least one less strongly adsorbable product gas component comprises hydrogen.

14. The vacuum pressure swing adsorption process of claim 1, wherein a highest adsorption pressure is in the range of about 100 kPa to about 2000 kPa, and the lowest desorption pressure is in the range of about 20 kPa to about 100 kPa.

15. The vacuum pressure swing adsorption process of claim 1, wherein the process can produce at least 200 tons/day $O_2$.

16. The vacuum pressure swing adsorption process of claim 15, wherein the process can produce at least 350 tons/day $O_2$.

17. A vacuum pressure swing adsorption process for separating a feed supply gas containing at least one more strongly adsorbable component and at least one less strongly adsorbable product gas component in a four bed system which comprises continuously feeding the supply gas into a feed input end of an adsorber bed containing at least one adsorbent which preferentially adsorbs the more strongly adsorbable component and withdrawing the at least one less strongly adsorbable product gas component from an exit end of the adsorber bed in a twelve-step cycle following the cycle chart:

|       | Step |     |         |       |       |         |       |       |        |       |       |       |
|-------|------|-----|---------|-------|-------|---------|-------|-------|--------|-------|-------|-------|
|       | 1    | 2   | 3       | 4     | 5     | 6       | 7     | 8     | 9      | 10    | 11    | 12    |
| Bed 1 | AD1  | AD2 | AD3/PPP | AD4   | ED    | PPG     | BD    | EV1   | PG/EV2 | EV3   | EU/FP | PP/FP |
| Bed 2 | EV3  | EU/FP | PP/FP | AD1   | AD2   | AD3/PPP | AD4   | ED    | PPG    | BD    | EV1   | PG/EV2 |
| Bed 3 | BD   | EV1 | PG/EV2  | EV3   | EU/FP | PP/FP   | AD1   | AD2   | AD3/PPP| AD4   | ED    | PPG   |
| Bed 4 | AD4  | ED  | PPG     | BD    | EV1   | PG/EV2  | EV3   | EU/FP | PP/FP  | AD1   | AD2   | AD3/PPP | wherein AD: Adsorption/Product Production, ED: Equalization Down, PPG: Provide Purge Gas, PPP: Provide Product Pressurization Gas, BD: Blowdown, PG: Receive Purge, EU: equalization Up, PP: product Pressurization, FP: Feed Pressurization, EV: Evacuation.

18. The vacuum pressure swing adsorption process of claim 17, wherein the at least one more strongly adsorbable component comprises nitrogen.

19. The vacuum pressure swing adsorption process of claim 17, wherein the at least one less strongly adsorbable product gas component comprises oxygen.

29. A vacuum pressure swing adsorption process for separating a feed supply gas containing at least one more strongly adsorbable component and at least one less strongly adsorbable product gas component in a four bed system which comprises continuously feeding the supply gas into a feed input end of an adsorber bed containing at least one adsorbent which preferentially adsorbs the more strongly adsorbable component and withdrawing the at least one less strongly adsorbable product gas component from an exit end of the adsorber bed in a twelve-step cycle following the cycle chart:

|       | Step |       |         |         |        |         |          |         |         |         |       |       |
|-------|------|-------|---------|---------|--------|---------|----------|---------|---------|---------|-------|-------|
|       | 1    | 2     | 3       | 4       | 5      | 6       | 7        | 8       | 9       | 10      | 11    | 12    |
| Bed 1 | AD1 (RC) | AD2 (CC) | AD3 (CC)/PPP | AD4 (CC)/PPG | ED/EV1 (RV) | PPG/EV2 (RV) | EV3 (RV) | EV4 (CV) | PG1/EV5 (CV) | PG2/EV6 (CV) | EU/FP (RC) | PP/FP (RC) |
| Bed 2 | PG2/EV6 (CV) | EU/FP (RC) | PP/FP (RC) | AD1 (RC) | AD2 (CC) | AD3 (CC)/PPP | AD4 (CC)/PPG | ED/EV1 (RV) | PPG/EV2 (RV) | EV3 (RV) | EV4 (CV) | PG1/EV5 (CV) |
| Bed 3 | EV3 (RV) | EV4 (CV) | PG1/EV5 (CV) | PG2/EV6 (CV) | EU/FP (RC) | PP/FP (RC) | AD1 (RC) | AD2 (CC) | AD3 (CC)/PPP | AD4 (CC)/PPG | ED/EV1 (RV) | PPG/EV2 (RV) |
| Bed 4 | AD4 (CC)/PPG | ED/EV1 (RV) | PPG/EV2 (RV) | EV3 (RV) | EV4 (CV) | PG1/EV5 (CV) | PG2/EV6 (CV) | EU/FP (RC) | PP/FP (RC) | AD1 (RC) | AD2 (CC) | AD3 (CC)/PPP |

20. The vacuum pressure swing adsorption process of claim 19, wherein the oxygen has an average purity of about 85-95% oxygen.

21. The vacuum pressure swing adsorption process of claim 19, wherein the oxygen corresponds to an oxygen recovery of about 55-75%.

22. The vacuum pressure swing adsorption process of claim 19, wherein each adsorption bed contains an $N_2$ selective adsorbent.

23. The vacuum pressure swing adsorption process of claim 22, wherein the adsorbent comprises at least one of: Li—X zeolite, 5A, 13X, CaX, and mixed cations zeolites.

24. The vacuum pressure swing adsorption process of claim 23, wherein the adsorbent comprises a LiX adsorbent.

25. The vacuum pressure swing adsorption process of claim 17, wherein the at least one less strongly adsorbable product gas component comprises hydrogen.

26. The vacuum pressure swing adsorption process of claim 17, wherein a highest adsorption pressure is in the range of about 100 kPa to about 2000 kPa, and a lowest desorption pressure is in the range of about 20 kPa to about 100 kPa.

27. The vacuum pressure swing adsorption process of claim 17, wherein the process can produce at least 200 tons/day $O_2$.

28. The vacuum pressure swing adsorption process of claim 27, wherein the process can produce at least 350 tons/day $O_2$.

wherein AD: Adsorption/Product Production, ED: Equalization Down, PPG: Provide Purge Gas, PPP: Provide Product Pressurization Gas, BD: Blowdown, PG: Receive Purge, EU: equalization Up, PP: product Pressurization, FP: Feed Pressurization, RC: Roots Compressor, CC: Centrifugal Compressor, RV: Roots Vacuum, CV: Centrifugal Vacuum, EV: evacuation.

30. The vacuum pressure swing adsorption process of claim 29, wherein the at least one more strongly adsorbable component comprises nitrogen.

31. The vacuum pressure swing adsorption process of claim 29, wherein the at least one less strongly adsorbable product gas component comprises oxygen.

32. The vacuum pressure swing adsorption process of claim 31, wherein the oxygen has an average purity of about 85-95% oxygen.

33. The vacuum pressure swing adsorption process of claim 31, wherein the oxygen corresponds to an oxygen recovery of about 55-75%.

34. The vacuum pressure swing adsorption process of claim 31, wherein each adsorption bed contains an $N_2$ selective adsorbent.

35. The vacuum pressure swing adsorption process of claim 34, wherein the adsorbent comprises at least one of: Li—X zeolite, 5A, 13X, CaX, and mixed cations zeolites.

36. The vacuum pressure swing adsorption process of claim 35, wherein the adsorbent comprises a LiX adsorbent.

37. The vacuum pressure swing adsorption process of claim 29, wherein the at least one less strongly adsorbable product gas component comprises hydrogen.

38. The vacuum pressure swing adsorption process of claim 29, wherein a highest adsorption pressure is in the range of about 100 kPa to about 2000 kPa, and a lowest desorption pressure is in the range of about 20 kPa to about 100 kPa.

39. The vacuum pressure swing adsorption process of claim 29, wherein the process can produce at least 200 tons/day $O_2$.

40. The vacuum pressure swing adsorption process of claim 39, wherein the process can produce at least 350 tons/day $O_2$.

* * * * *